United States Patent
Coppin et al.

(10) Patent No.: US 11,995,738 B2
(45) Date of Patent: May 28, 2024

(54) METHOD FOR GENERATING A MULTIMEDIA ELEMENT WHEN READING A MEDIUM, TERMINAL, AND SYSTEM

(71) Applicant: UNIQUE ENTERTAINMENT EXPERIENCE, Paris (FR)

(72) Inventors: Stanislas Coppin, Paris (FR); Barthélémy Kiss, Paris (FR); Christian Navelot, Clamart (FR); Yann Mangematin, Paris (FR)

(73) Assignee: UNIQUE ENTERTAINMENT EXPERIENCE, Paris (FR)

( * ) Notice: Subject to any disclaimer, the term of this patent is extended or adjusted under 35 U.S.C. 154(b) by 194 days.

(21) Appl. No.: 17/600,911

(22) PCT Filed: Mar. 27, 2020

(86) PCT No.: PCT/EP2020/058857
§ 371 (c)(1),
(2) Date: Oct. 1, 2021

(87) PCT Pub. No.: WO2020/201158
PCT Pub. Date: Oct. 8, 2020

(65) Prior Publication Data
US 2022/0189076 A1 Jun. 16, 2022

(30) Foreign Application Priority Data
Apr. 2, 2019 (FR) ...................................... 1903530

(51) Int. Cl.
*G06T 11/00* (2006.01)
*G06F 18/22* (2023.01)
(Continued)

(52) U.S. Cl.
CPC .............. *G06T 11/00* (2013.01); *G06F 18/22* (2023.01); *G06T 7/246* (2017.01); *G06T 7/73* (2017.01);
(Continued)

(58) Field of Classification Search
CPC . G06T 11/00; G06T 7/246; G06T 7/73; G06T 2207/30201; G06V 40/168; G06V 40/166; G06F 18/22
See application file for complete search history.

(56) References Cited

U.S. PATENT DOCUMENTS 8,922,481 B1 12/2014 Kauffmann et al.
2003/0093784 A1 5/2003 Dimitrova et al.
(Continued)

OTHER PUBLICATIONS

AppleInsider ("Memoji Create Your Own and Share Your Personalized Animoji", 2018, https://www.youtube.com/watch?v=Z5XkRwzq9Ak ) (Year: 2018).*
(Continued)

*Primary Examiner* — Xin Sheng
(74) *Attorney, Agent, or Firm* — Pillsbury Winthrop Shaw Pittman LLP

(57) ABSTRACT

A method for generating a first multimedia element includes reading a first media; acquiring at least one image of at least one face of a user; detecting a plurality of characteristic points of the face of the user; generating at least one physiological parameter from at least one processing of at least one characteristic point detected; generating a first multimedia element superimposed on the first media being played on the display, the first multimedia element being determined according to at least the value of the physiological parameter; emitting simultaneously to the generating a piece of digital data deduced from the value of the physiological parameter, the piece of digital data further including a time marker of the first media.

16 Claims, 5 Drawing Sheets

Figure 1:
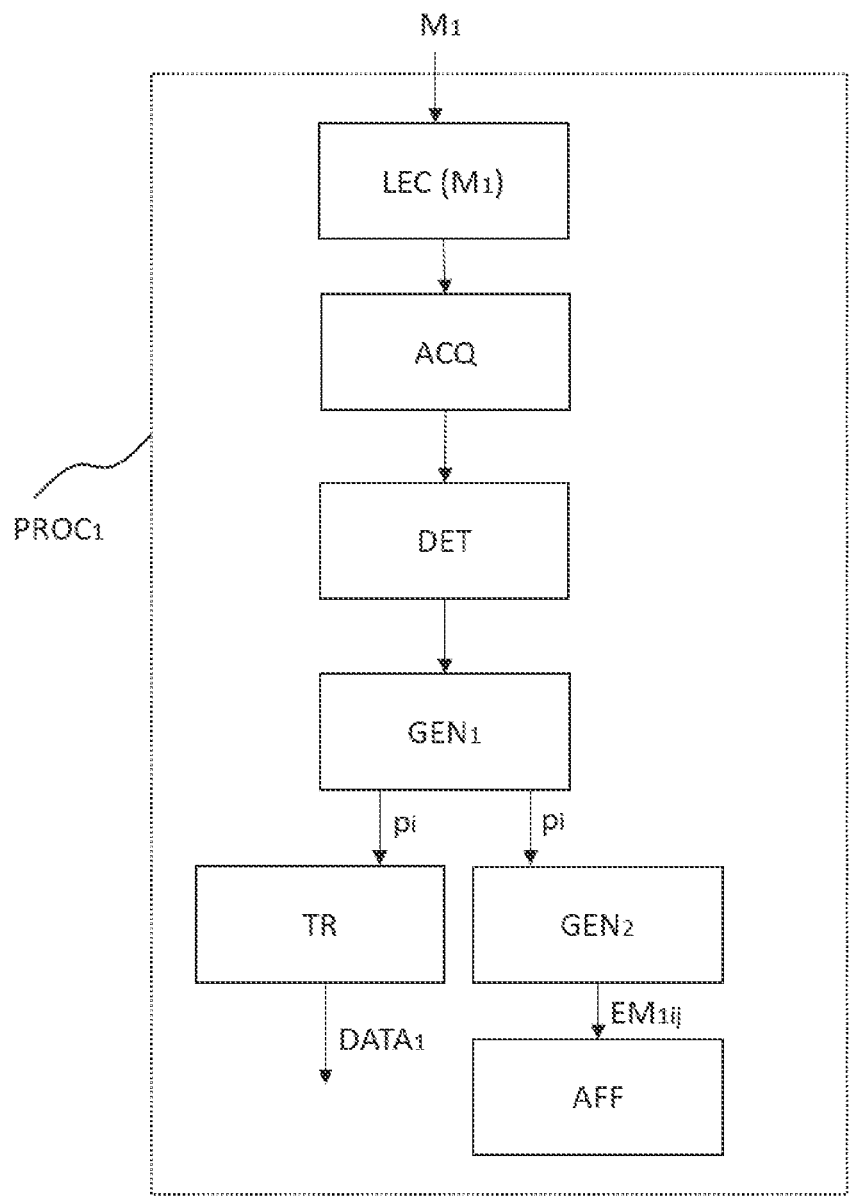

(51) Int. Cl.
G06T 7/246 (2017.01)
G06T 7/73 (2017.01)
G06V 40/16 (2022.01)

(52) U.S. Cl.
CPC .......... *G06V 40/166* (2022.01); *G06V 40/168* (2022.01); *G06T 2207/30201* (2013.01)

(56) References Cited

U.S. PATENT DOCUMENTS

| | | | |
|---|---|---|---|
| 2003/0206171 A1* | 11/2003 | Kim | G06V 40/162 |
| | | | 345/473 |
| 2009/0183220 A1 | 7/2009 | Amento et al. | |
| 2011/0134026 A1 | 6/2011 | Kang et al. | |
| 2012/0072939 A1 | 3/2012 | Crenshaw | |
| 2017/0099519 A1* | 4/2017 | Dang | H04N 21/4223 |
| 2018/0303397 A1* | 10/2018 | Krupat | G16H 50/20 |
| 2018/0330152 A1* | 11/2018 | Mittelstaedt | G06V 40/174 |
| 2019/0012527 A1* | 1/2019 | Wang | G06F 3/012 |

OTHER PUBLICATIONS

International Search Report as issued in International Patent Application No. PCT/EP2020/058857, dated May 4, 2020.

* cited by examiner

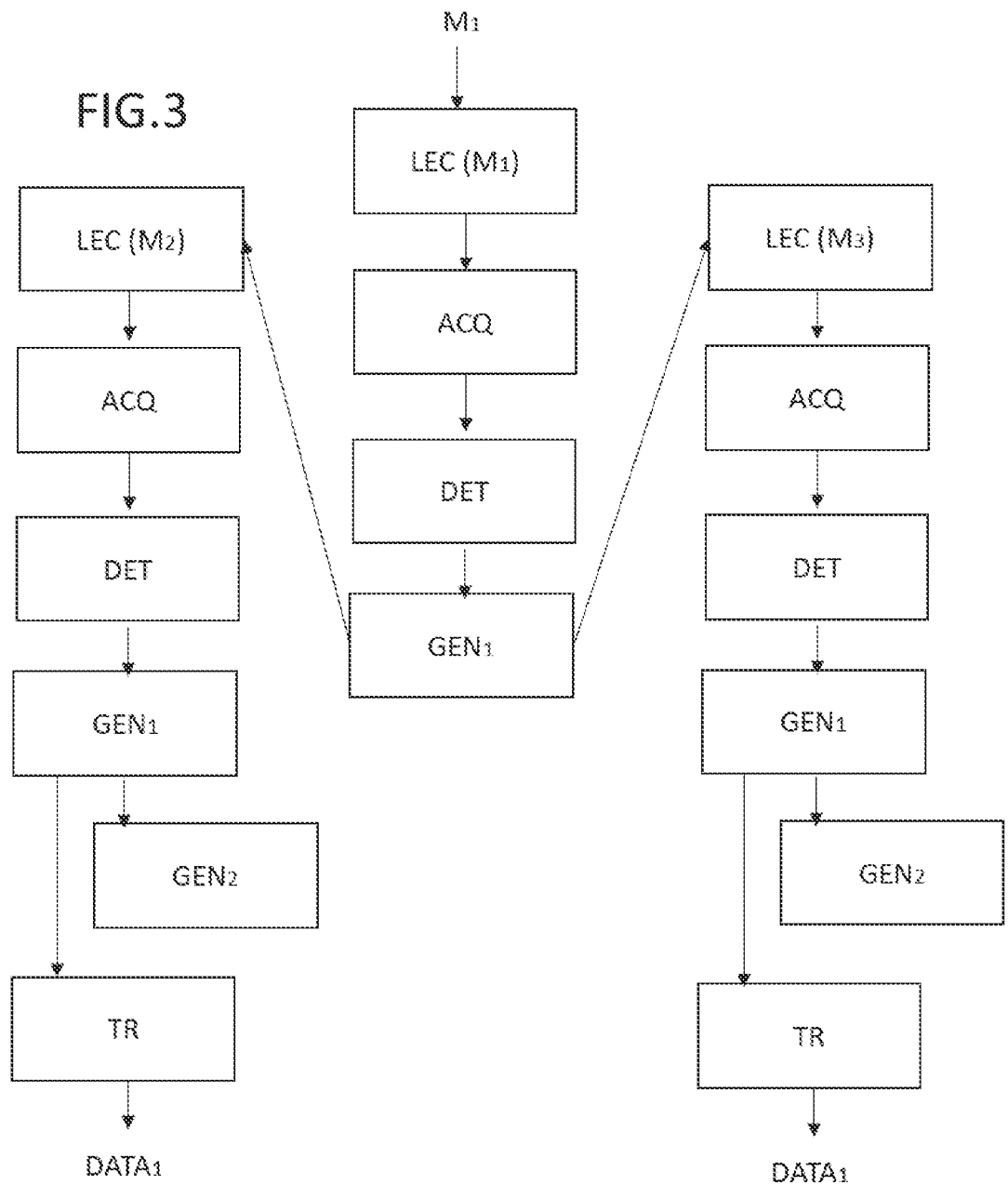

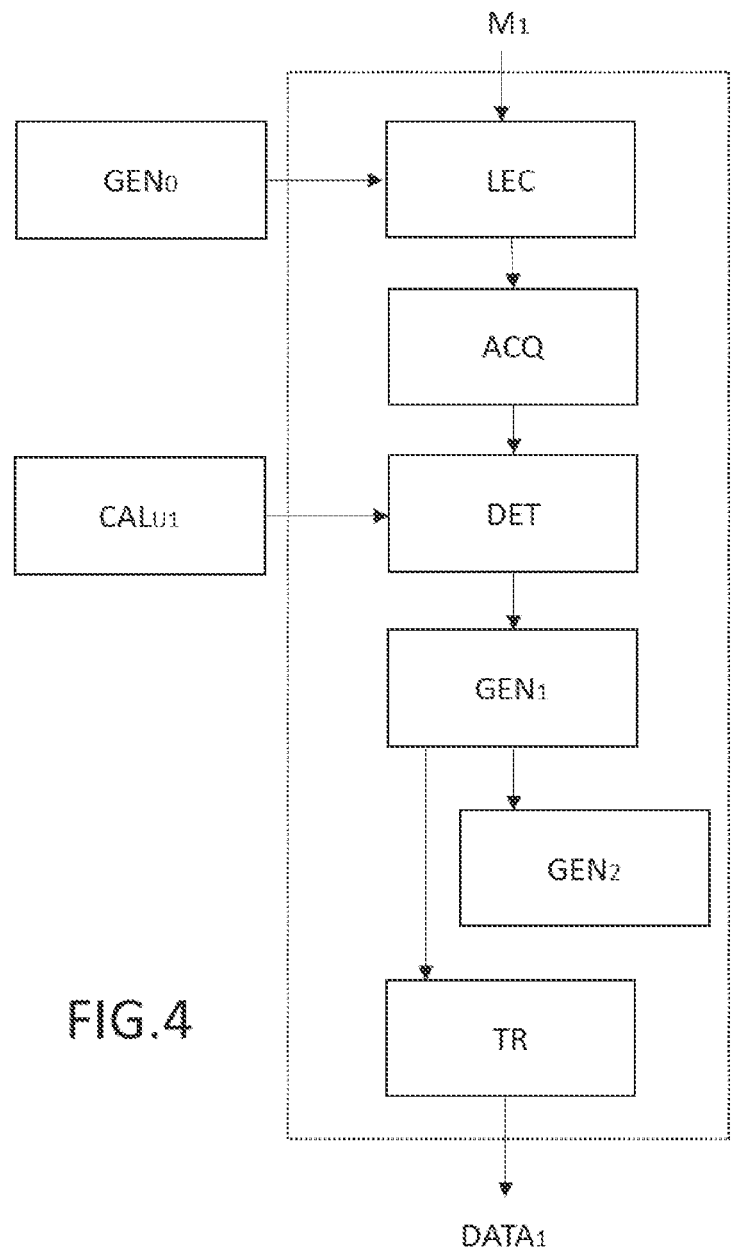

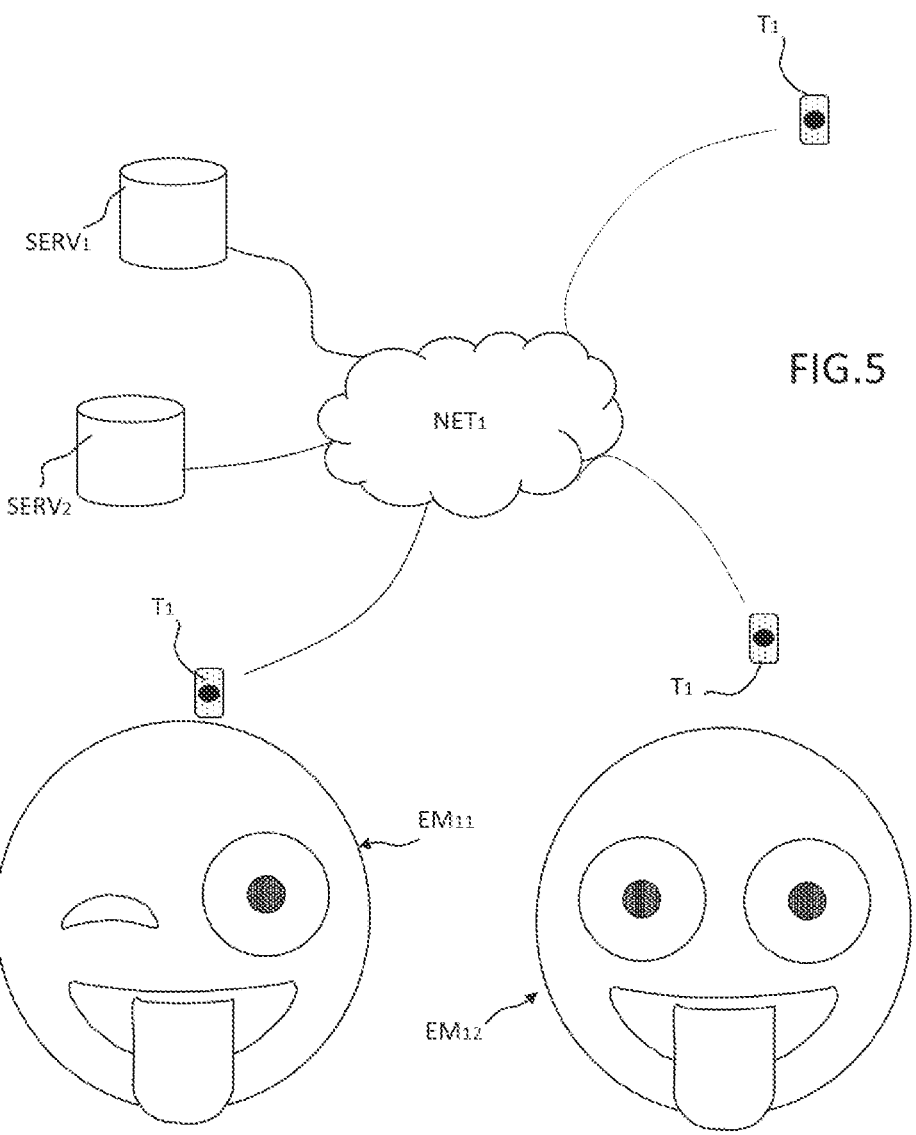
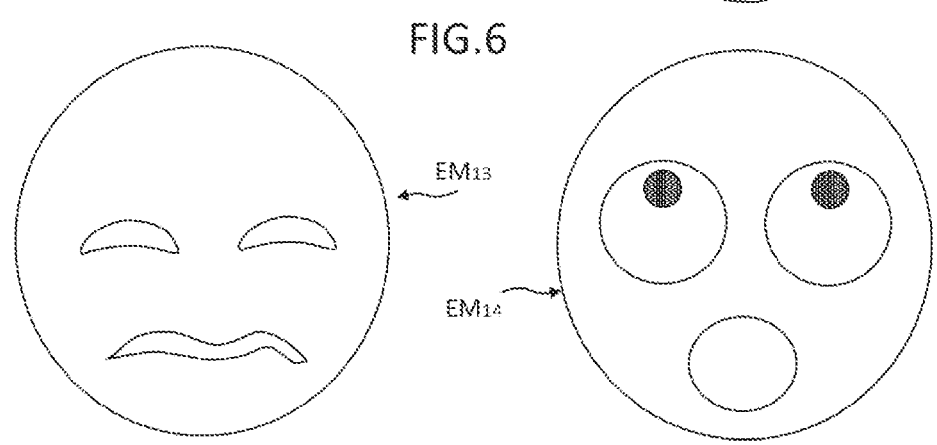

METHOD FOR GENERATING A MULTIMEDIA ELEMENT WHEN READING A MEDIUM, TERMINAL, AND SYSTEM

CROSS-REFERENCE TO RELATED APPLICATIONS

This application is the U.S. National Stage of PCT/EP2020/058857, filed Mar. 27, 2020, which in turn claims priority to French patent application number 1903530 filed Apr. 2, 2019. The content of these applications are incorporated herein by reference in their entireties.

The field of the invention relates to the field of methods aiming to produce graphics elements interactively. More particularly, the field of the invention relates to the methods and devices aiming to generate digital data and graphics elements that take into account physiological parameters of a user.

There are currently different techniques to generate multimedia elements according to an action of a user. A user action is generally a manual action carried out on an interface of the keyboard type or a touch-sensitive interface. Other means can be used to engage an interaction, for example a mouse or a command from a voice.

However, it can be useful to generate an action from an action of the user that does not require a manual interaction with an interface of the keyboard type. This can be, for example, an interaction with the face of the user. This is in particular made possible thanks to the presence of cameras on most terminals or computers and by means of facial recognition algorithms.

However, these interactions are one-off, involve a single user and are targeted according to a given service. By way of example, there is the unlocking of a Smartphone through recognition of characteristic points of the face, eye gaze tracking through recognition of the iris in particular for head-up displays in aeronautics or fun applications for transforming the face, called "morphing", in order to superimpose graphics elements on a face of a user or to apply thereon deformations or crossings between different individuals. There are other dedicated types of applications that use characteristic points of the face. However, none of these current solutions offers a use of the capacities of analysis of the face from characteristic points to generate enriched interactions.

There is therefore a need to define a solution that can respond to this problem.

The present invention aims to resolve the aforementioned disadvantages.

According to a first aspect, the invention relates to a method for generating a first multimedia element comprising:
Reading a first media on a display of a digital terminal;
Acquiring at least one image of at least one face of a user from an optics of said digital terminal, said acquiring being carried out in real time during the reading of the first media;
Detecting a plurality of characteristic points of the face of the user from at least one acquired image;
Generating at least one physiological parameter from at least one processing of at least one characteristic point detected;
Generating a first multimedia element superimposed on the first media being played on the display, said first multimedia element being determined according to at least the value of the physiological parameter;
Emitting of a piece of digital data deduced from the value of the physiological parameter, said piece of digital data further comprising a time marker of said first media, said emitting being carried out by means of a communication interface intended fora server collecting said piece of digital data.

An advantage of this embodiment is to send the digital data with an offset in time with regards to the generating of the multimedia element. This offset can be used to carry out preprocessing operations on the data acquired from the user or to carry out filtering steps. An interest is to emit to the server data that restores a true state of the interactions desired and produced by a user. According to an embodiment, the latter is prompted to confirm the sending of the digital data, for example via an action button. According to an example, a user can replay the media a second time and confirm each multimedia element that was generated following a first playing.

According to another aspect, the invention relates to a method for generating a first multimedia element comprising:
Reading a first media on a display of a digital terminal;
Acquiring at least one image of at least one face of a user from an optics of said digital terminal, said acquiring being carried out in real time during the reading of the first media;
Detecting a plurality of characteristic points of the face of the user from at least one acquired image;
Generating at least one physiological parameter from at least one processing of at least one characteristic point detected;
Generating a first multimedia element superimposed on the first media being played on the display, said first multimedia element being determined according to at least the value of the physiological parameter;
Emitting simultaneously to the step of generating a piece of digital data deduced from the value of the physiological parameter, said piece of digital data further comprising a time marker of said first media, said emitting being carried out by means of a communication interface intended for a server collecting said piece of digital data.

An advantage of this embodiment is to allow a user to restore in real time within a community of users their emotions or their attitudes that are displayed on the multimedia content that is being played on their terminal. Moreover, another advantage is to simultaneously carry out an emission to a remote server to share the physiological parameter with a community of users during their future playing of the media. The interest of this embodiment is to produce a content that can be distributed on a short time scale within a community by favoring the spontaneity of the interactions produced.

According to an embodiment, the method comprises prior to the step of playing, selecting a first media from among a predefined list of medias.

According to an embodiment, the method comprises prior to the step of playing, a generating of a list of medias, said medias being associated with a media profile of which the correlation with the user profile of the first user defines a value greater than a threshold. An advantage is to generate a list that is relevant fora given user.

According to an embodiment, the step of detecting comprises:
a first processing comprising an evaluation of the positions of the characteristic points;

a second processing comprising an evaluation of the movement of the characteristic points, of which at least one speed vector, a third processing comprising an evaluation of the similarity of values obtained from the same processings of a plurality of characteristic points.

An advantage is to define a very large variety of expressions, emotions or attitudes of a large panel of individuals.

According to an embodiment, the generating of a physiological parameter comprises:

determining a given set of processings of a set of characteristic points detected and;

comparing the value obtained from each processing with a predefined threshold;

generating a physiological parameter according to the result of the step of comparing.

An advantage is to allow for a definition of a large range of physiological parameters in particular thanks to the possibility of carrying out highly diverse combinations of different processings.

According to an embodiment, each physiological parameter generated is associated with a quantification data of the latter which is calculated according to a predefined scale. A first advantage is to make it possible to take account of different scales of emotion or attitude in order to generate a wider range of graphics elements resulting from the quantification of a physiological parameter, such as a big smile or a slight smile. A second advantage is to improve a possible standardization of the physiological parameters to each user according to a user profile.

According to an embodiment, each quantification of a physiological parameter is standardized according to a user profile. An advantage is to generate the same interaction produced within a community homogeneously between different individuals.

According to an embodiment, a step of calibrating is carried out beforehand wherein at least one range of values of a quantification of a given physiological parameter is adjusted according to at least one weighting coefficient, said weighting coefficient taking account of at least one element among which:

A general shape of the face of a user;

Relative positions of a subset of characteristic points, said positions defining calibration positions;

A movement of a subset of characteristic points during a lapse of time, said movements defining calibration movements, A history of values of physiological parameters already generated fora given user.

An advantage is to produce an interaction true to the intent of its author and regardless of cultural or ethological particularities, genre or relating to any other factor that can modify the interpretation of an emotion or of an attitude with respect to an average or a fixed reference.

According to an embodiment, the generating of a given first multimedia element is a function of a given generated physiological parameter, said multimedia element being selected from a list of first multimedia elements recorded in a memory and associated with a given physiological element. An advantage is to have and to enrich a wide range of multimedia elements reflecting as many expressions, attitudes or emotions of users.

According to an embodiment, the position in the media, the dimensions, the animation speed or the color of a generated first multimedia element is a function of the quantification of the generated physiological parameter. An advantage is to enrich the content distributed by taking account of a degree of reaction of at least one user.

According to an embodiment, the duration and/or the position and/or the trajectory of a multimedia element are defined according to the quantification of the generated physiological parameter. An advantage is to produce interactions linked to a level of reaction of a user.

According to an embodiment, a multimedia element is generated during a predefined duration at a predefined position on the display and carries out a given trajectory. An advantage is to use the display surface of the video to produce an enriched content. The animations produced participate in the playing experience of the media and encourage the users to express their emotions or their reactions during the playing of the media.

According to an embodiment, a multimedia element can be a combination of multimedia elements among which:

A text integrated or not into a graphics element;

A predefined image;

An animated image,

A predefined sound.

An advantage is to produce varied multimedia content that can integrate a large number of user interactions in order to enrich the restitution of a community of users in different forms.

According to an embodiment, a multimedia element is an emoji, i.e. an image representing an emotion or a mood deduced from at least one physiological parameter generated. An advantage is to produce a graphics element representing a mirror indication of the user, i.e. true to the emotion produced by the face of a user.

According to an embodiment, when a given physiological element is generated, the method of the invention activates the playing of a second media. An advantage is to generate a multimedia content comprising different medias, possibly different natures, such as sounds, films or animations. An advantage is to produce a content triggered on an interaction of the user that does not require a manual action. An advantage is to produce a content according to a given interaction of a user.

According to an embodiment, the first media is played during a predefined duration until a predefined instant of the media, the method generating a play loop of said first media during a given lapse of time. An advantage is to create a dynamic hold in the media. The media is played over a short animation loop, for example 1 to 5 s, even several seconds to a few minutes. Thus, in the framework of a game, the user has the time to understand that it is expected of them to produce a given interaction. According to other contexts, this makes it possible to confirm the steps of playing, for example when it entails interactive training.

According to an embodiment, the method comprises the generating of a plurality of second multimedia elements superimposed on the first media displayed on the display of the first user, said second multimedia elements being generated at given instants and corresponding to values of physiological parameters generated previously from a plurality of users who have viewed the same media. An advantage is to generate interactive content that takes account of much feedback from a community at the time of the playing of the media by a given user. The latter can live the experience proposed by considering reactions that have already been emitted by other users.

According to an embodiment, the method comprises the generating of a first counter of physiological parameters generated previously from a plurality of users, each physiological parameter being counted at a given moment of the first media according to the time marker that is associated with it. An advantage is to mark the media with high moments during which many interactions were generated. The user viewing a given media can in turn emit reactions by generating new multimedia elements that will then be integrated into all the others that are already aggregated. An interest is therefore to have users participate in order to enrich the data displayed during the playing of a media and which are associated with it.

According to an embodiment, a step of collecting digital data by a remote server comprises, furthermore, the aggregation of the data of a plurality of users who have viewed the same first media, said aggregation of data generating at least one label associated with the media. An advantage is to allow for a new categorization of multimedia content. This classification has the advantage of being more spontaneous than a conventional classification. Indeed, the classification is based on data spontaneously emitted by a plurality of users. It therefore offers a possibility of taking account of emotional data of users that is finer than a conventional categorization. Moreover, the classification can be done by taking emotions into account all throughout the media. There is therefore a time granularity that is not taken into account in the current classification systems.

According to an embodiment, the label of a media is generated when a threshold of a given number of given generated physiological parameters is reached in predefined time windows with regards to a time marker associated with the first media. An advantage is to label a media only when a sufficient number of interactions of the same type have been generated. This solution prevents taking account of insignificant interactions or interactions generated without any real causal relationship with the content at a given instant. Furthermore, this prevents taking into consideration multimedia elements generated with error.

According to another aspect, the invention relates to a computer program product comprising at least one memory and a calculator, said program comprising program code instructions executed on a computer for implementing steps of the method of the invention.

According to another aspect, the invention relates to a terminal comprising a calculator, a memory and a display for implementing the method of the invention. An advantage is to make it possible to download an application on a Smartphone. The medias can then be viewed directly from a terminal. Each terminal can be configured with data specific to a given user.

According to another aspect, the invention relates to a system comprising a plurality of terminals of the invention, further comprising at least one server configured to collect the data emitted by said terminals. An advantage is to process all the user interactions in such a way as to create community indicators that make it possible to enrich the playing of a media.

Figure 2:
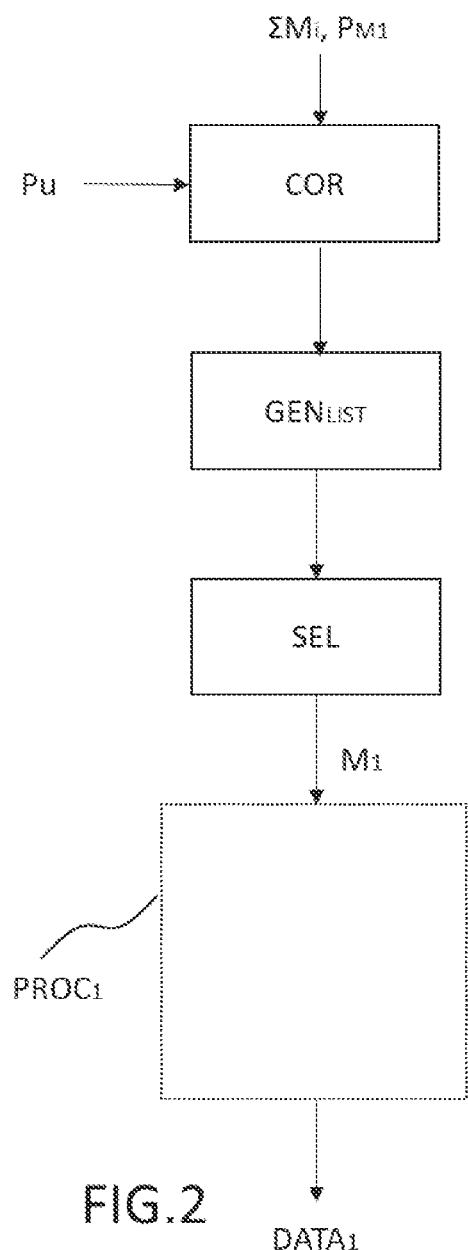

Other characteristics and advantages of the invention shall appear when reading the following detailed description, in reference to the accompanying figures, which show:

FIG. 1: an embodiment including the main steps of the method of the invention;

FIG. 2: an embodiment comprising preliminary steps relative to the selection of a media by a user;

FIG. 3: an embodiment of the method of the invention wherein a user interaction makes it possible to activate a new scenario comprising the playing of a new media;

FIG. 4: an embodiment wherein a calibration step and a step of integrating graphics elements from a community are generated dynamically during the playing of a media;

FIG. 5: an example of the architecture of the system of the invention representing different user terminals and servers for implementing the method of the invention, FIG. 6: an example of representations of graphics elements in the form of emojis.

FIG. 1 shows steps of a possible implementation of the method of the invention.

Playing a Media

According to an embodiment, the method comprises a first step LEC ($M_1$) of playing a media $M_1$. This step is carried out for example by means of a multimedia player. The playing is carried out on a support of the Smartphone type, or on a digital tablet or a computer. Generally, the media is played on any type of digital support that has a display. According to an example, the media is stored on a media archive server. FIG. 4 shows two servers $SERV_1$, $SERV_2$ and three terminals $T_1$, $T_2$, $T_3$. In this case, the terminal of a first user $U_1$ is the first terminal $T_1$. The media is played on this first terminal $T_1$. It can be downloaded beforehand from the remote server $SERV_2$. Alternatively, it can be played as streaming, i.e. continuously from the server $SERV_2$. In this latter case, the playing is carried out at the same time as the loading of the media. According to another configuration, the media $M_1$ is downloaded from a plurality of servers according to a distributed architecture.

According to different embodiments, the first media $M_1$ is preferably a video. It can be encoded, compressed or encrypted according to different algorithms. The format of the video can be according to example cases of which the extensions are as follows: .mov, .rm, .wmv, .wmf, .mp4, m4v, .mkv. All the other video formats that are not listed are also compatible with the method of the invention. The videos can be of different predefined durations. According to an example, the videos include a sequence of images that tell a story according to a given presentation and according to a given scenario wherein an action unfolds and fictive characters are moving. Other types of examples of videos can be implemented with the method of the invention, such as filmed or animated videos or multimedia files that combine excerpts of films and animations.

According to an embodiment, the videos are associated with dialogues that can be integrated into balloons. The latter are intended to be displayed at predefined moments in the video. Time markers can be associated with these multimedia elements which are represented.

According to an example, a video is sequenced in such a way as to comprise a plurality of scenes that are chained together. The chaining of one scene to another can be, for example, triggered when a multimedia element or when a physiological parameter is generated by an action of the user.

In the rest of the description a multimedia element and a graphics element that designate the same entity are named indifferently.

Acquiring an Image of the Face

The method of the invention comprises a step of acquiring noted as ACQ. The step of acquiring ACQ is preferably carried out by an acquiring of images from an optical sensor. The optical sensor is for example at least one camera of a computer, a Smartphone or a tablet. In the rest of the description, this equipment is designated by a terminal. It is generally understood that the camera is fixed to the terminal and that the user orients the terminal in such a way as to film themselves.

Preferably, the acquiring is carried out with a sampling ranging from 60/s to 1 i/s. Other samplings that are more or less faster than this range would be compatible with the method of the invention. However, choosing a fast sampling makes it possible to carry out the processings in real time. Therefore, this configuration streamlines the interactions of the user with regards to the media that is being played. A sampling of the image capture of a user ranging from 15 i/s to 30 i/S is for example sufficient to offer good response dynamics to generate multimedia elements in real time. According to an embodiment, the acquisition speed is configured automatically according to parameters that take account of the level of the battery, the type of video selected, the resolution or the size of the video played or its duration or of the scenario specific to the video.

According to other examples, the acquiring ACQ is an acquisition of a sound, a temperature, a pressure, a rate of humidity or any digital setpoint that can be generated from a sensor and triggered spontaneously by an action generated in the environment of the user of the terminal. In the rest of the description, the example treated is that of a video or of a set of images acquired by the camera of a terminal.

According to an embodiment, the image acquired by the camera is an image of a face of a user $U_1$. In this case, the user positions the terminal facing themselves in such a way as to play the media $M_1$ at the same time the camera is oriented facing their face.

Detection of Characteristic Points

The method of the invention implements a method for detecting a set of characteristic points of the face in order to extract therefrom parameters of positions, kinematic parameters, dynamic parameters and also comparisons of these different parameters in order to deduce therefrom symmetry data or geometrical signatures in order to select a given archetype.

A technology such as that of ARkit developed by Apple can be used, another technology such as that of ARCore from Google can be used. Other similar technologies can be used in combination with the invention in such a way as to extract characteristic points of the face, positions of a set of characteristic points, movements and speeds of a set of points, etc. to qualify geometrical signatures of an expression, an attitude or a mood, etc.

According to an embodiment, the method of the invention is capable of defining geometrical signatures relative to highly diverse facial expressions. In particular, there is: winking, blinking, both eyes closed for a lapse of time, smiling, mouth open, a cheekbone movement or a creasing of the forehead, etc. The method also makes it possible to compare changes in the characteristic points of the face that have a symmetry and that change jointly successively or sequentially. Furthermore, the symmetry or the dissymmetry in the change of characteristic points of the face can be compared in such a way as to identify a given geometrical signature.

According to an embodiment, the characteristic points are points such as the lateral ends of the eyes, the central point of the iris of the eye, certain points defining the contour of the mouth or of the nose. This can be points that delimit a portion of the face. According to an example, the characteristic points define curves such as contours of zones of the face or shapes defining characteristic zones.

An archetype is defined by the presence of at least one given geometrical signature. The archetype refers more to an expression, an attitude or a mood such as joy, astonishment, etc. The geometrical signature refers more to the presence of a smile in the face or a winking. Generally, an archetype can comprise the presence of a plurality of geometrical signatures. However in the rest of the description it is possible to refer indifferently to a geometric signature or an archetype in that according to an example, an archetype can be defined by the presence of a single geometrical signature, such as the presence of a winking.

Processings of Characteristic Points

The invention comprises a step aiming to carry out processings on the characteristic points.

According to a first processing $T_1$, the evaluation of the positions of certain characteristic points is carried out. The positions can be calculated in a referential linked to the plane of the image and taking the characteristic dimensions of the face into account. According to an example, the dimensions of the face and the orientation of the face with respect to the focal plane of the camera are corrected by correction coefficients. An interest is to obtain a referential that is stable, uniform and homogeneous in order to reference coordinates of points. According to a first example, the positions of certain characteristic points are compared with reference positions of these same points. The reference positions can be obtained for example for a given expression of the face of a user at a given instant. According to a second example, the positions of the characteristic points are compared with the positions calculated at a preceding instant. Thus, it is the change in the positions of the characteristic points relatively over time which is evaluated. According to an example, the modifications of the positions of the characteristic points are standardized according to a predefined scale.

In this example, a trigger can be implemented to save remarkable positions of characteristic points that have simultaneously changed positions. Thus, a subset of characteristic points that has changed positions makes it possible to define a given archetype of expression or mood of the face. The first processing generates a positive result in case of a triggering following a comparison of a position with a reference.

According to a second processing $T_2$, the evaluation of the movement of certain characteristic points detected is carried out. The movement of the points can be evaluated by a direction, a duration during which characteristic points change. When a movement of one or several characteristic points is detected and compared to a predefined reference movement, the processing can generate a positive result. Furthermore, joint movements of different characteristic points can be correlated in order to detect a given geometric signature or directly a given archetype. The simultaneity of the movements of certain points can also be evaluated. Furthermore, a chaining or a sequence of detected movements can be compared to an expected sequence in order to detect the presence of a geometrical signature or an archetype concerning the expression of the face of a user.

According to this second processing, the speed or the acceleration of certain characteristic points can be evaluated. When these values relative to certain characteristic points exceed a predefined threshold, a trigger makes it possible to record particular variations. According to an example, comparisons or correlations between variations of different points make it possible to deduce the presence of a geometrical signature or archetype concerning a given expression of the face of the user. The speed or acceleration data can be standardized according to a predefined scale in such a way as to compare them with homogeneous thresholds over time or to compare them from one use to another. When a threshold is exceeded, the processing makes it possible to generate a positive result.

According to a third processing $T_3$, comparisons of changes in the speed or in the acceleration of a set of characteristic points defining different zones of the face are carried out. These comparisons make it possible to analyze symmetrical modifications, such as a blinking of the eyes, or dissymmetrical modifications, such as the winking of an eye. For example, a processing indicating a given symmetry makes it possible to generate a positive result.

An example of the use of the speed is for example the generating of a graphics element that corresponds to a balloon. The geometric signature is an opening of the mouth of the user chained to the closure thereof. The mouth carries out a movement such as the movement of the mouth of a fish, the two lips touch each other repeatedly. In this case, the method of the invention is capable of creating as many balloons as the number of mouth openings detected. In order to distinguish this case from the opening of a mouth relative to an archetype linked to the astonishment of a user, the speed of the change of the characteristic points of the mouth can be analyzed.

A fourth processing $T_4$ can be implemented according to the method of the invention. The fourth processing $T_4$ makes it possible to detect a graphics element that is different from the points or characteristic zones of the face. This can be for example detecting the presence of a hand of a user or of a movement of said hand. According to another example, this can be color or brightness data making it possible to deduce information on the environment around the user. According to another example, the presence of a second person in the range of the camera or of the passage of an object in the foreground or in the background, i.e. behind the user $U_1$ can be detected. When such a processing $T_4$ makes it possible to deduce a given situation, a positive result is generated. The following examples are possibly implemented by the method of the invention: "hand in front of the mouth", "hand on the forehead", "hand flat on the head", "hand on the head forming a crest", "thumb up", etc.

According to an embodiment, a set of processing is carried out in real time on the images acquired by the camera.

According to an embodiment, a database comprising predefined archetypes is stored in a memory. This data can be stored in a memory of the terminal or of a remote server. The archetypes are defined by a set of geometrical signatures detected simultaneously or in a predefined limited time window. These geometrical signatures can be defined as "patterns". The signatures comprise the definition of a plurality of characteristic points defining at least one zone of the face and of which the processing made it possible to generate a positive result.

An archetype can be defined from several geometrical signatures. Consequently, when all the geometrical signatures of an archetype are detected, the method of the invention makes it possible to generate a physiological parameter that corresponds to the detected archetype. The physiological parameter $p_i$ is associated with a multimedia element $EM_{1ij}$. The physiological parameter $p_i$ can correspond to a mood, an emotion, a reaction, an attitude or an action of the user. By way of example, there are the following archetypes: exasperation, surprise, astonishment, dismay, laughter, smiling, chuckles, wild laughter, anger, mistrust, threat, etc.

The archetypes can correspond to a combination of geometrical signatures detected simultaneously or sequentially. Each geometric signature can be defined by a set of points having undergone a modification making it possible to trigger positive results of the processings. Thus, certain archetypes include a unique geometric signature that can possibly include a low number of characteristic points and other archetypes can comprise a large number of geometrical signatures of different natures and that impact zones far from each other of the face.

According to an embodiment, the geometrical signatures of a user $U_1$ are saved. According to a case, an algorithm for standardizing geometrical signatures is carried out, for example from an artificial intelligence algorithm. Such an algorithm makes it possible to qualify a signature for a given individual, for example over time. By way of example, the statistics for detecting a geometric signature for a first individual $U_1$ can be comprised between 0.4 and 0.8 on a scale from 0 to 1. In this latter case, "0" corresponds to the absence of a geometric signature and "1" corresponds to the presence of the signature to a maximum degree. In other terms, the scale makes it possible to quantify the geometric signature. "0.8" can correspond for example to a big smile and "0.6" is an average smile and 0.4 to "a rictus" of the user $U_1$. For a second individual $U_2$, the same geometric signature can be comprised between 0.1 and 1. "1" can correspond for example to a big smile and "0.5" is an average smile and 0.1 to "a rictus" of the user $U_2$. It is understood that this scale depends on many factors such as the age of the individual, their origin, their culture, their modesty or a past event, such as repeated breakups that can provoke in the individual a so-called "mistrust" smile even when they are supposed to be smiling in their conscious. An interest of the standardization algorithm implemented in the method of the invention is to calibrate the processings of the method of the invention in order to detect the presence of a given geometric signature for a given user. Such an algorithm makes it possible to "re-standardize" the quantification scale of a given geometric signature. FIG. 4 shows a step $CAL_{U1}$ that corresponds to a step of calculating that takes account of an element of the user $U_1$ and for example of their profile $Pu_1$ in order to refine the detection of the characteristic points, possible carry out a step of correcting or of standardizing in order to generate a standardized physiological parameter.

When a physiological parameter is generated, the method of the invention automatically generates a multimedia element $EM_{1ij}$ that is associated with it in a database. The step of generating a physiological element is noted as $GEN_1$ and the step of generating a graphics element is noted as $GEN_2$ in FIG. 1.

The multimedia element $EM_{1ij}$ is then displayed on the display of the user $U_1$ superimposed on the video $M_1$ which is being played. The display, noted as AFF in FIG. 1, can be carried out on an edge of the display or at the edge of the player used to play the video or on the video itself when it is integrated into a graphics environment. By way of example, the multimedia element $EM_{1ij}$ is generated from the lower portion of the video $M_1$. According to an example, the multimedia element $EM_{1ij}$ is animated via superimposition on the video with is being played. The animation of the multimedia element can include the generating of a movement of the latter, for example from bottom upwards. Other animations can be carried out such as a movement of vibration, a movement forming a curve, or in rotation of the graphics element around a point defined on the graphics element itself. According to an example, the graphics element $EM_{1ij}$ changes color, gets larger or shrinks. For example in the case of a balloon, the latter can explode at the end of a travel that it is carrying out by rising towards the top of the video. According to another example, the graphics element $EM_{1ij}$ is displayed for a lapse of time before disappearing. Its disappearance can be carried out progressively by applying a progressive transparency to the graphics element $EM_{1i}$.

According to an example, the graphics elements $EM_{1ij}$ are emojis. Emojis are for example associated with the physiological parameters in such a way as to graphically represent an emotion, an attitude or an expression of a user $U_1$. Thus, the production of graphics elements $EM_{1ij}$ is carried out in such a way as to offer a mirror interaction of the expression of a user. FIG. 6 shows example of emojis that can be generated according to various generated physiological parameters.

A first emoji $EM_{11}$ has one eye closed and the tongue sticking out, it can be generated when corresponding geometrical signatures have been detected from the processings carried out on the characteristic data, such as points, curves, characteristics shapes. A second example $EM_{12}$ shows an emoji comprising both eyes open and a tongue sticking out. A third example $EM_{13}$ shows an emoji comprising both eyes closed and a mouth characterizing disappointment or miscontent. A fourth example $EM_{14}$ shows an emoji having an open mouth and the eyes looking upwards characterizing astonishment.

According to another example, the graphics elements $EM_{1ij}$ are texts, for example integrated into balloons. The texts can be displayed in the dedicated zones of the media such as zones where characters appear.

According to an embodiment, the media $M_1$ is played until a given instant predefined by a time marker. The time marker can be used as metadata of the media or it can be controlled from a remote server. The instant at which the media is on hold is predefined. The media $M_1$ is, for example, played in a loop over a short sequence. During the detection of a given user interaction, the media then resumes playing. The user interaction can correspond to the detecting of a physiological element detected by the terminal or by a remote server. According to a case, it is a remote server that activates the various sequences of the media $M_1$ according to the physiological elements received. For example, a winking can be expected in order to continue the playing of the media. In this case, either the media is frozen at a given instant, or it is played in a loop over the last second of the media. The time during which the media is in a loop is configured beforehand and can be adapted to each sequence.

Emission of Data to a Server

The method of the invention comprises a step TR aiming to emit data $DATA_1$ to a remote server, for example $SERV_1$. The data $DATA_1$ comprises, for example, a first piece of data that describes the physiological element pi that was generated beforehand. Alternatively, the first pieces of data directly comprise the geometrical signatures that made it possible to determine the generated physiological element pi. The data $DATA_1$ emitted further comprises second piece of data comprising at least one time marker $t_i$. The time marker ti corresponds to the instant at which the physiological parameter pi was generated in the time marker of the media $M_1$. Thus, the data $DATA_1$ comprises at least one value pair $(p_i, t_i)$. According to a case, the data $DATA_1$ comprises a media identifier $M_1$ and a user identifier $ID_{U1}$ or alternatively a user profile $Pu_1$.

A remote server $SERV_1$ receives the data emitted by the terminal $T_1$ of the user $U_1$. According to an embodiment, the server $SERV_1$ receives at each instant a plurality of data $DATA_1$ emitted from a multitude of terminals of a plurality of users. Distributed architectures make it possible to carry out this data collection coming from different terminals by a plurality of servers. The rest of the description details the case of a single collection server, however the method of the invention relates to all the embodiments implemented with distributed architectures in different ways.

The server $SERV_1$ collects the data $DATA_1$ emitted by different users. The data is classified by media and is then aggregated in such a way as to feed a time counter of physiological parameters. Thus, at each instant of a media $M_1$, the method of the invention makes it possible to count the number of physiological parameters accumulated during the playing of the media.

According to an embodiment, the counter is generated by the server $SERV_1$ or another server at each playing of the media by a given user. This step is noted as $GEN_0$ in FIG. 4 and shows that the playing of the video is simultaneously carried out with the superimposing of a counter displayed on the media $M_1$. An interest is to represent a volume of interactions of a community that has reacted to the same media, for example, at high moments of the media $M_1$.

According to an embodiment, the physiological elements collected from a plurality of users are sorted by category in such a way that the same physiological elements are listed at each instant of the media $M_1$. This is made possible thanks to the analysis of the time markers associated with each physiological element generated. Thus, it is possible to restore community indicators $EM_{2ij}$ coming from a plurality of physiological elements generated from a plurality of users at the same instants or in a reduced time window. This community indicator $EM_{2ij}$ can take the form of a graphics element of the same type as the graphics elements $EM_{1ij}$ generated by each user. The community indicator can then be generated by the server $SERV_1$ intended for users who are viewing the media $M_1$ that is being played. The community indicator $EM_{2ij}$ is then superimposed during the playing of the media $M_1$. At each instant a new community indicator can be displayed superimposed on the media $M_1$ played.

In this configuration, when a media $M_1$ is played on a terminal $T_1$ of a user $U_1$, community indicators $EM_{2ij}$ are displayed superimposed on the media $M_1$ and graphics elements $EM_{1ij}$ of the user $U_1$ are also displayed superimposed on the media.

According to an embodiment, the graphics elements $EM_{1ij}$ can change in a given zone of the media and the community indicators $EM_{2ij}$ can change in another zone of the media at the same time.

The community indicators are for example emojis. In certain embodiments, the community indicators can be graphics elements sized in proportion to the number of collected physiological elements of the same type. According to an example, the number of physiological elements of a community indicator is displayed, for example when a threshold is exceeded. According to an example, the community indicators are animated, the animation can for example depend on the number of physiological indicators collected at a given instant of a media $M_1$. An interest of a such a return coming from a community of users superimposed on the media is to restore for a given user a collective interaction that can encourage them to interact as well. According to an example, a rare graphics element $EM_{1ij}$, i.e. relatively little generated by the community, can be displayed longer or be displayed in dimensions that are more substantial that the other graphics elements $EM_{1ij}$. Identically, a community indicator $EM_{2ij}$ can also be generated for received physiological elements that are rare or little generated by a community of users. Taking account of the rarity of a generated physiological element makes it possible to encourage other users to enrich their interactions during the playing of a media $M_1$.

According to an embodiment, the physiological indicators $p_i$ can be used to profile medias, i.e. categorize them or "tag" them. An interest is to classify a media library on a criterion of spontaneous interaction of a set of users. During the use of the medias profiles as such, the method of the invention can take account, according to the profile of a user, of a given category of media. A media can be classed as "surprising", another as "hilarious" and another as "shocking".

The method of the invention makes it possible to offer another possibility of classifying multimedia content and another way of consuming medias. An advantage is to offer a high performance solution in terms of using a multimedia library, for example when the medias are videos. An advantage is also to instantaneously restore emotions during the playing of a media. An advantage is to obtain feedback that are more spontaneous and less intellectualized during a later restitution after the experience of playing the media.

FIG. 2 shows preliminary steps that can be carried out before the method of the invention. A step of selecting a media noted as SEL allows a user to choose the media that they wish to view. Beforehand, a step $GEN_{LIST}$ is, for example, carried out by the method of the invention. The generated list of medias can be generated by taking account of a media date, a popularity of the media, a number of physiological elements generated by media. According to another example, the list is generated according to the user profile Pu. The method then comprises a step aiming to make use of the user data that is recorded in a memory. The user data can correspond to preferences defined by the latter or it can correspond to data collected during preceding playings. The data thus collected makes it possible to define the preferences of a user.

According to an embodiment, the medias $M_1$ and their category are taken into account to generate a relevant list for a given user. Thus, a media $M_1$ can comprise a media profile $P_{M1}$. A step of correlating data of a media profile $P_{M1}$ and of the user profile $P_{U1}$ can be implemented prior to the generating of the media list $M_1$. This correlation can be applied to a set of medias noted as $\Sigma M_i$.

The main steps of the method are noted as $PROC_1$ in FIG. 1 and are therefore designated as such in FIG. 2.

FIG. 3 shows a case of interaction of a user U1 during the playing of a media M1 wherein a physiological element generates a change in the media. Thus the playing of the media M1 is then interrupted in order to activate a media M2 or a media M3. According to an example, the change in media is presented in such a way that the first media $M_1$ is played until a given time marker. When the first media $M_1$ is played until reaching the predefined time marker, a short sequence of the media $M_1$ is played in a loop as mentioned hereinabove. The media $M_1$ is then played until the user $U_1$ provokes a change in the media by interacting with the latter. The interaction can correspond to a physiological element pi that is expected and detected. Identically, the processing that follows is either carried out locally within the terminal, or by a remote server that activates the resuming of the playing.

In the case of FIG. 3, when the method generates $GEN(p_1)$ a first physiological element $p_1$ consecutively to a given user interaction at a given instant of the playing of the media $M_1$, the step of playing a second media $M_2$ is activated. In the case of FIG. 3, the case is considered where another scenario could have occurred with the playing of the media $M_3$ at the same instant and alternatively to the playing of the media $M_2$. The playing of the media $M_3$ could have occurred if the method of the invention had generated a physiological element $p_2$. The steps that are then carried out during the playing of the media $M_2$ or $M_3$ are similar to the steps of FIG. 1. An advantage is to make it possible to define user experiences comprising a scenario implementing different medias that are activated according to the emotions of a user.

According to another embodiment of the invention, a chaining of medias is carried out in such a way that each media is generated and displayed according to given user interactions. The physiological elements that are expected and that activate a change in the media can be predefined.

FIG. 5 shows an example of an architecture making it possible to implement the method of the invention. A set of user terminals $T_1$, $T_2$, $T_3$ is shown. A first server $SERV_1$ makes it possible to carry out the main steps of the method of the invention. A data network, noted as NET, such as internet can be used to exchange digital data between the various entities represented. The servers SERV1, SERV2 can be configured to carry out different functions or similar functions, such as the emitting of a media content, collecting user data, calculating community indicators, identifying a user with a service, etc.

The invention claimed is:

1. A method for generating a first multimedia element comprising:
   reading a first media on a display of a digital terminal;
   acquiring at least one image of at least one face of a user from an optics of said digital terminal, said acquiring being carried out in real time during the reading of the first media;
   detecting a plurality of characteristic points of the face of the user from at least one acquired image;
   generating at least one physiological parameter from at least one processing of at least one characteristic point detected;
   generating a first multimedia element superimposed on the first media being played on the display, said first multimedia element being determined according to at least the value of the physiological parameter;
   emitting simultaneously to generating a piece of digital data deduced from the value of the physiological parameter, said piece of digital data further comprising a time marker of said first media, said emitting being carried out by means of a communication interface intended for a server collecting said piece of digital data,
   wherein the generating of a first multimedia element is a function of a generated physiological parameter, said first multimedia element being selected from a list of first multimedia elements recorded in a memory and associated with a physiological element, said first multimedia element being generated during a predetermined duration at a predefined position on the display and carries out a given trajectory, and wherein:
      the position in the media, the dimensions, the animation speed or the color of a generated first multimedia element is a function of the quantification of the generated physiological parameter; and/or,
      the duration and/or the position and/or the trajectory of a multimedia element is/are defined according to the quantification of the generated physiological parameter.

2. The method according to claim 1, comprising prior to reading:
   generating a list of medias, said medias being associated with a media profile of which the correlation with the user profile of the first user defines a value greater than a threshold;
   selecting a first media from among a predefined list of medias.

3. The method according to claim 1, wherein the detecting comprises:

a first processing comprising an evaluation of the positions of the characteristic points;

a second processing comprising an evaluation of the movement of the characteristic points, of which at least one speed vector, a third processing comprising an evaluation of the similarity of values obtained from the same processings of a plurality of characteristic points.

4. The method according to claim 3, wherein the generating of a physiological parameter comprises:

determining of given set of processings of a set of characteristic points detected and;

comparing the value obtained from each processing with a predefined threshold;

generating a physiological parameter according to the result of the step of comparing.

5. The method according to claim 1, wherein each physiological parameter generated is associated with a quantification data of the latter which is calculated according to a predefined scale.

6. The method according to claim 1, wherein each quantification of a physiological parameter is standardized according to a user profile.

7. The method according to claim 6, further comprising carrying out a calibrating beforehand wherein at least one range of values of a quantification of a given physiological parameter is adjusted according to at least one weighting coefficient, said weighting coefficient taking account of at least one element among which:

a general shape of the face of a user;

relative positions of a subset of characteristic points, said positions defining calibration positions;

a movement of a subset of characteristic points during a lapse of time, said movements defining calibration movements, a history of values of physiological parameters already generated for a given user.

8. The method according to claim 1, wherein a multimedia element can be a combination of multimedia elements among which:

a text integrated or not into a graphics element;

a predefined image;

an animated image;

a predefined sound, an emoji, which corresponds to an image representing an emotion or a mood deduced from at least one physiological parameter generated.

9. The method according to claim 1, wherein when a given physiological element is generated, the method activates the playing of a second media.

10. The method according to claim 1, wherein the first media is played during a predefined duration until a predefined instant of the media, the method generating a play loop of said first media during a given lapse of time.

11. The method according to claim 1, further comprising generating of a plurality of second multimedia elements superimposed on the first media displayed on the display of the first user, said second multimedia elements being generated at given instants and corresponding to values of physiological parameters generated previously from a plurality of users having viewed the same media.

12. The method according to claim 1, further comprising generating of a first counter of physiological parameters generated previously from a plurality of users, each physiological parameter being counted at a given moment of the first media according to the time marker that is associated with it.

13. A computer program product comprising at least one non-transitory memory encoded with program code instructions and a calculator, said program code instructions executed on a computer for implementing steps of the method of claim 1.

14. A terminal comprising a calculator, a memory and a display for implementing the method of claim 1.

15. A system comprising a plurality of terminals according to claim 14, and at least one server configured to collect the data emitted by said terminals.

16. A method for generating a first multimedia element comprising:

reading a first media on a display of a digital terminal;

acquiring at least one image of at least one face of a user from an optics of said digital terminal, said acquiring being carried out in real time during the reading of the first media;

detecting a plurality of characteristic points of the face of the user from at least one acquired image;

generating at least one physiological parameter from at least one processing of at least one characteristic point detected;

generating a first multimedia element superimposed on the first media being played on the display, said first multimedia element being determined according to at least the value of the physiological parameter;

emitting simultaneously to generating a piece of digital data deduced from the value of the physiological parameter, said piece of digital data further comprising a time marker of said first media, said emitting being carried out by means of a communication interface intended for a remote server collecting said piece of digital data, wherein collecting digital data by the remote server comprises, furthermore, the aggregation of the data of a plurality of users who have viewed the same first media, said aggregation of data generating at least one label associated with the media, the label being generated when a threshold of a given number of given generated physiological parameters is reached in predefined time windows with regards to a time marker associated with the first media.

* * * * *